(12) United States Patent
Rahm

(10) Patent No.: US 11,504,900 B2
(45) Date of Patent: Nov. 22, 2022

(54) METHOD OF FOLDING EDGES OF TRIM PARTS

(71) Applicant: Richard Rahm, Monclova, OH (US)

(72) Inventor: Richard Rahm, Monclova, OH (US)

( * ) Notice: Subject to any disclaimer, the term of this patent is extended or adjusted under 35 U.S.C. 154(b) by 408 days.

(21) Appl. No.: 16/788,811

(22) Filed: Feb. 12, 2020

(65) Prior Publication Data

US 2020/0180207 A1 Jun. 11, 2020

Related U.S. Application Data

(63) Continuation-in-part of application No. 15/902,991, filed on Feb. 22, 2018, now Pat. No. 10,752,388.

(60) Provisional application No. 62/804,242, filed on Feb. 12, 2019, provisional application No. 62/461,810, filed on Feb. 22, 2017.

(51) Int. Cl.
*B29C 53/04* (2006.01)
*B29C 53/84* (2006.01)
*B29L 31/30* (2006.01)

(52) U.S. Cl.
CPC .............. *B29C 53/04* (2013.01); *B29C 53/84* (2013.01); *B29L 2031/3041* (2013.01)

(58) Field of Classification Search
CPC .......... B29L 2031/58; B29L 2031/3011; B29L 2031/3041; B60R 13/0212; B60R 13/02
See application file for complete search history.

(56) References Cited

U.S. PATENT DOCUMENTS 6,161,895 A * 12/2000 Jaeckle ............... B29C 67/0044
296/214
2012/0161478 A1* 6/2012 Eickhoff ................. B32B 5/245
296/214

FOREIGN PATENT DOCUMENTS

DE          4308925 A1 *  2/1995  ............. B29C 63/04

* cited by examiner

*Primary Examiner* — Barbara J Musser
(74) *Attorney, Agent, or Firm* — Schaffer, SchAub & Marriott, Ltd.

(57) ABSTRACT

A method of folding edges of trim parts includes the following steps. Place an inner surface of a substrate against a panel support so that an upper end of the substrate is disposed above a top end of the panel support. Press a backup blade against an outer surface of the substrate beneath the upper end of the substrate. A folder tool of an edge folding apparatus is urged against the inner surface of the upper end of the substrate in a horizontal direction which laterally folds the upper end 96 of the substrate. Remove the backup blade from the outer surface of the substrate. Then urge the folder tool of the edge folding apparatus against the inner surface of the substrate in a vertical direction and downwardly folding the upper end 96 of the substrate.

6 Claims, 7 Drawing Sheets

METHOD OF FOLDING EDGES OF TRIM PARTS

CROSS-REFERENCE TO RELATED APPLICATION

This application claims the benefit of priority of U.S. provisional application No. 62/804,242, filed Feb. 12, 2019, and is a continuation-in-part of U.S. non-provisional application Ser. No. 15/902,991, filed Feb. 22, 2018, now U.S. Pat. No. 10,752,388, which claims benefit of priority of U.S. Provisional application No. 62/461,810, filed Feb. 22, 2017, the contents of which are herein incorporated by reference.

BACKGROUND OF THE INVENTION

The present invention relates to a method of folding and more particularly to a method of folding edges of trim parts using a heat source and a blade.

When attempting to a fold a covered substrate back over on to itself, bumps are often formed due to poor control of the moving material. Many materials are scrapped because of the current process, which wastes time and money.

As can be seen, there is a need for an improved method of folding edges of trim parts.

SUMMARY OF THE INVENTION

In one aspect of the present invention, a method of folding edges of trim parts comprises steps of: placing an inner surface of a substrate against a panel support so that an upper end of the substrate is disposed above a top end of the panel support; pressing a backup blade against an outer surface of the substrate beneath the upper end of the substrate; urging a folder tool against the inner surface of the substrate in a horizontal direction and laterally folding the upper end of the substrate; removing the backup blade from the outer surface of the substrate; and urging the folder tool against the inner surface of the substrate in a vertical direction and downwardly folding the upper end of the substrate.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
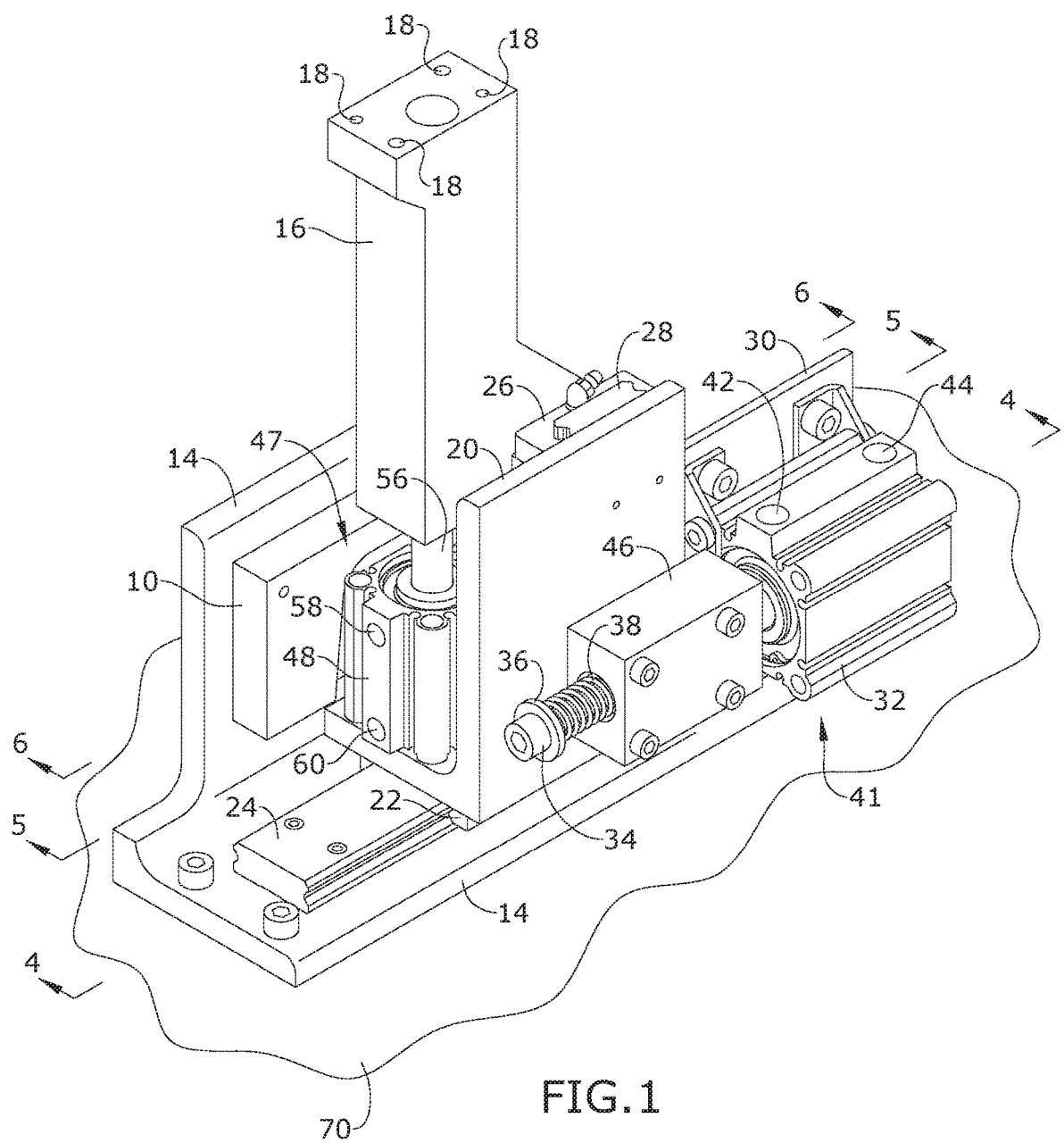
FIG. 1 is a perspective view of an embodiment of the present invention, illustrated without the folder tool.
Figure 2:
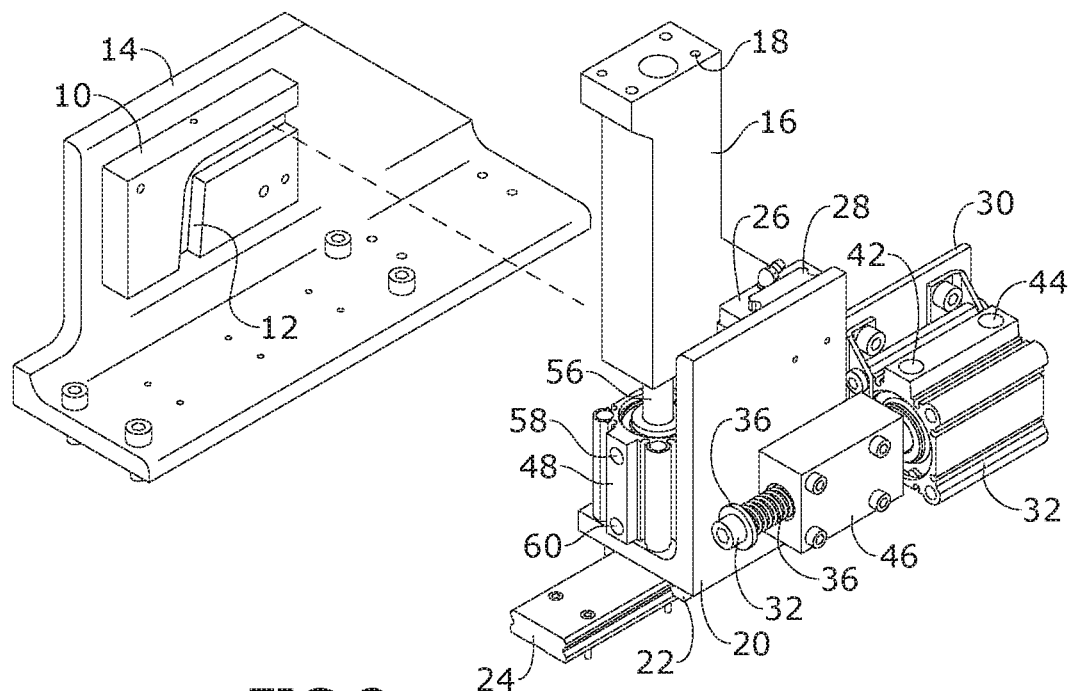
FIG. 2 is a partial front exploded view of an embodiment of the present invention.
Figure 3:
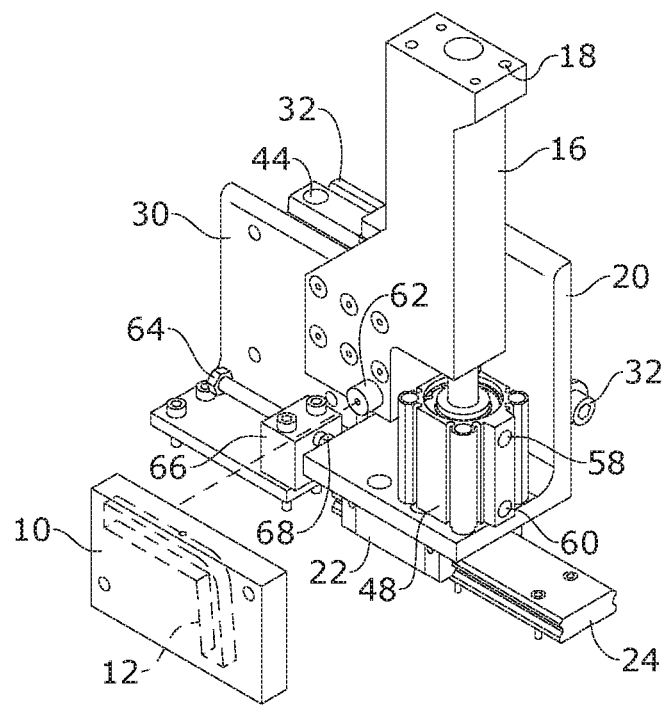
FIG. 3 is a partial rear exploded view of an embodiment of the present invention, with the fixed base removed for illustrative clarity.
Figure 4:
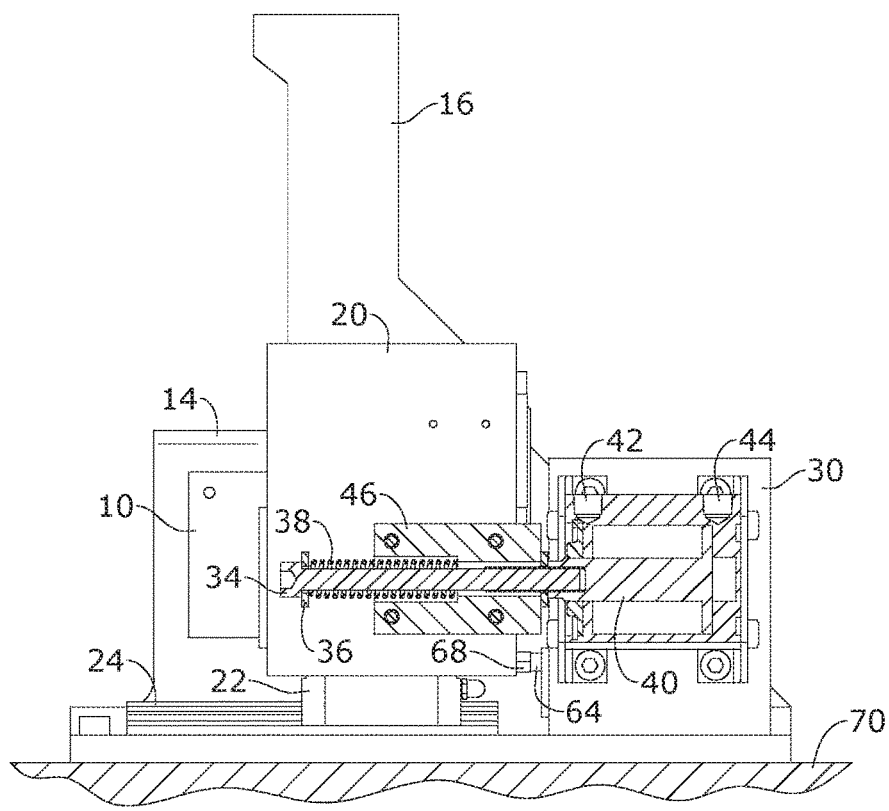
FIG. 4 is a section view of the present invention, taken along line 4-4 in FIG. 1.
Figure 5:
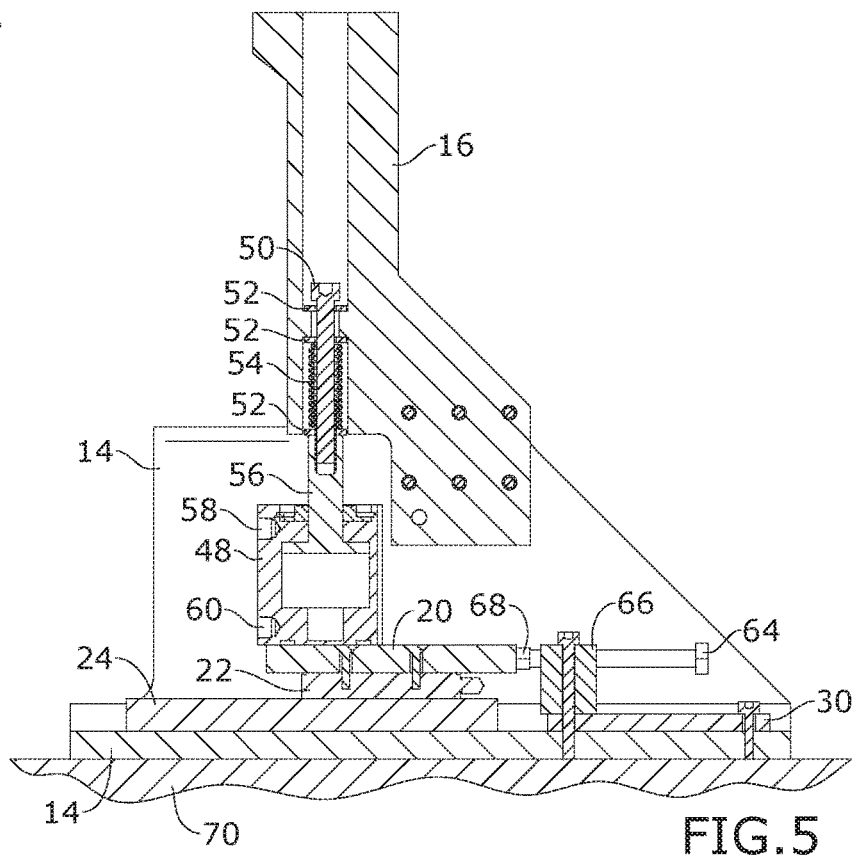
FIG. 5 is a section view of the present invention, taken along line 5-5 in FIG. 1.
Figure 6:
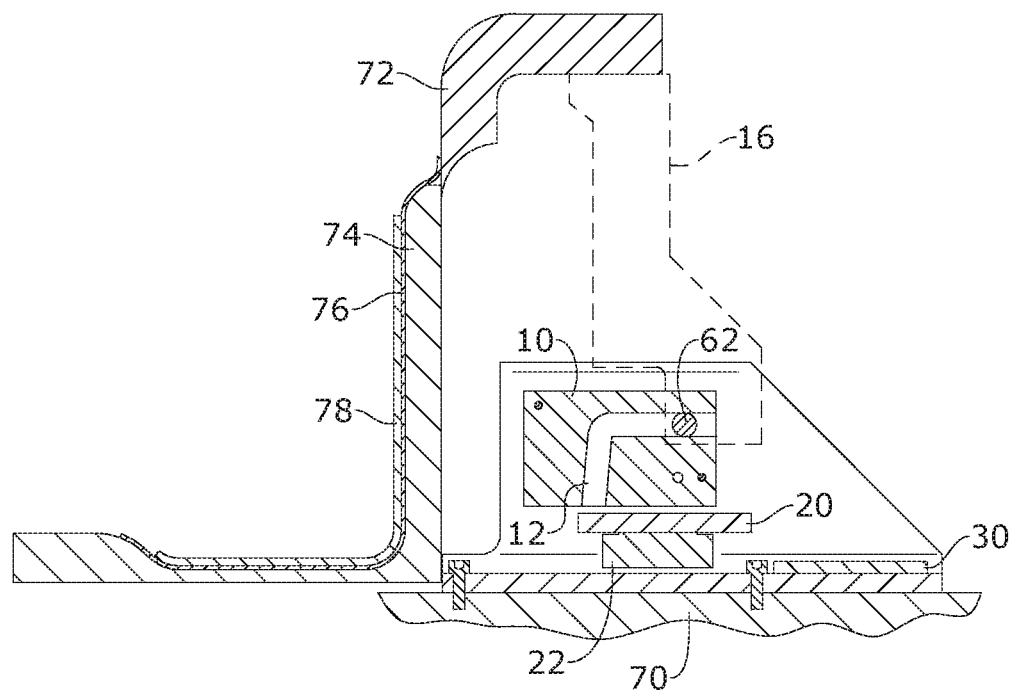
FIG. 6 is a section view of the present invention, taken along line 6-6 in FIG. 1, with the folder tool attached.
Figure 7:
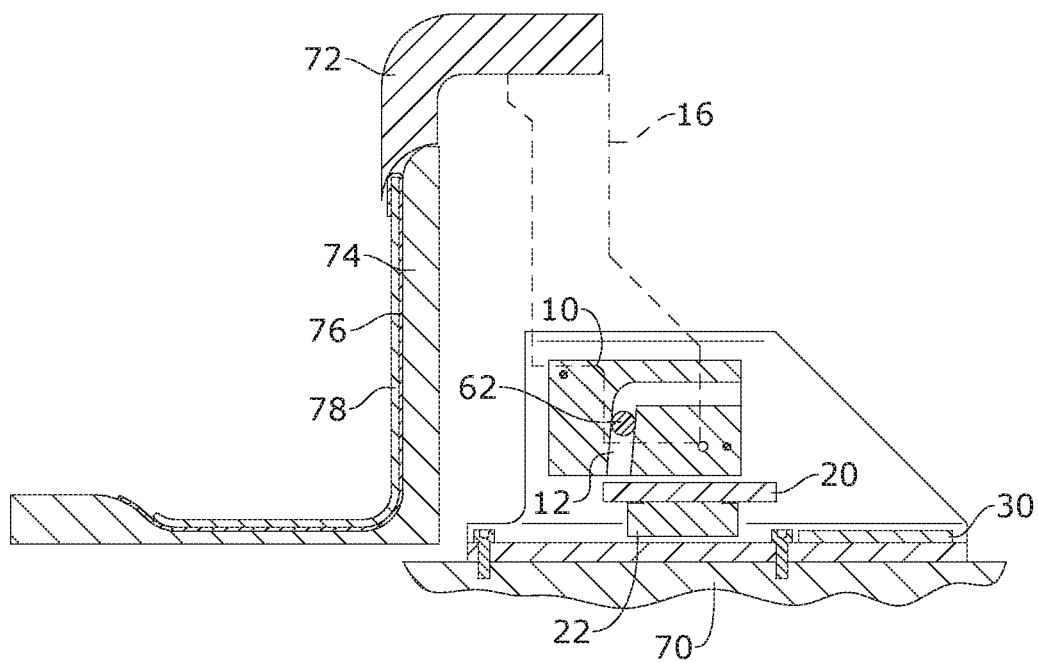
FIG. 7 is a section view of the present invention illustrating the folder tool folding material over a substrate.

Referring to FIGS. 1 through 7, the present invention includes an edge folding apparatus. The edge folding apparatus includes a fixed base 14 having a horizontal track 24. The fixed base 14 is mounted to a mounting surface 70. The edge folding apparatus further includes a fixed guide block 10 having either a channel 12 or a peg 62. The channel 12 includes a horizontal portion leading to a vertical portion. A sliding base 20 is slidably coupled to a horizontal track 24. The sliding base 20 includes a vertical track 28. A tool mount block 16 is slidably coupled to the vertical track 28. The tool mount block 16 includes the other of the channel 12 or the peg 62. The peg 62 slides along and is guided by the channel 12. A first linear actuator 41 pushes the sliding base 20 along the horizontal track 24 and a second linear actuator 47 pushes the tool mount block 16 along the vertical track 28.

A folder tool 72 is secured to the tool mount block 16 by bolts and mount holes 18. A panel support 74 holds a substrate 78, such as a panel of an automobile. A material 76, such as cloth, leather, etc., is adhered to the substrate 78. The first linear actuator 41 pushes the sliding base 20 along the horizontal track 24, which in turn pushes the tool mount block 16 forward. The peg 62 slides along the horizontal portion of the channel 12 and the folder tool 72 is pushed forward against an upper edge of the attached material 76. Once the peg 62 reaches the vertical portion of the channel 12, the peg 62 and tool mount block 16 are pulled downward by the second linear actuator 47 along the vertical portion of the channel 12. The folder tool 72 drops downward with the tool mount block 16, thereby folding the upper edge of the attached material 76 around an upper edge of the substrate 78. Heat or an adhesive may be applied to adhere the upper edge of the material 76 to the substrate 78. The second actuator 47 then pushes the tool mount block 16 upward along the vertical portion of the channel 12 and back to the horizontal portion of the channel 12. The first actuator 41 then pulls the tool mount block 16 back along the horizontal portion, completing the process.

In certain embodiments, the fixed base 14 includes a horizontal portion and a vertical portion. The horizontal track 24 is coupled to the horizontal portion and the fixed guide block 10 is coupled to the vertical portion. In certain embodiments, the fixed guide block 10 includes the channel 12 and the peg 62 is coupled to the tool mount block 16. The vertical portion of the channel 12 may be slightly above 90 degrees relative to the horizontal portion, such as between about 91 degrees and about 100 degrees, such as at about 95 degrees. In such embodiments, the folder tool 72 is guided along substantially the same angle as the upper surface of the panel support 74, precisely folding the material 76 over the upper edge and against the substrate 78. In certain embodiments, the peg 62 has a cylinder shape and an outer corner connecting the vertical portion and the horizontal portion of the channel 12 is rounded, providing for a smooth transition between the horizontal and the vertical movement of the folder tool 72.

In certain embodiments, the sliding base 20 includes a horizontal portion and a vertical portion. The vertical track 28 is coupled to an inner surface of the vertical portion and the second linear actuator 47 is coupled to an upper surface of the horizontal portion. A horizontal bearing block 22 is coupled to the lower surface of the horizontal portion. The horizontal bearing block 22 slides along the horizontal track 24. In certain embodiments, a vertical bearing block 26 is coupled to the tool mount block 16. The vertical bearing block 26 slides along the vertical track 28.

The first linear actuator 41 may be a pneumatic actuator and/or a servo actuator. In certain embodiments, a pneumatic cylinder 32 is coupled to the fixed base 14 by a cylinder mount bracket 30. A cylinder rod 40 is operable to slide within the pneumatic cylinder 32. A pressure is applied within the pneumatic cylinder 32 via a first cylinder port 42 and a second cylinder port 44. When the pressure is applied to the second cylinder port 44, the cylinder rod 40 drives the sliding base 20 away from the pneumatic cylinder 32 along the horizontal track 24. When the pressure is applied to the first cylinder port 44, the cylinder rod 40 pulles the sliding base 20 towards the pneumatic cylinder 32 along the horizontal track 24.

In certain embodiments, the sliding base 20 may continue to slide away from the pneumatic cylinder 32 even when the cylinder rod 40 is no longer pushing the sliding base 20. A bolt block 46 is coupled to the vertical portion of the sliding base 20. A cylinder bolt 34 runs through the bolt block 46. The cylinder bolt 34 includes a proximal end mechanically fastened to the cylinder rod 40 and a distal end disposed beyond the bolt block 46. A spring 38 is disposed around the cylinder bolt 34 in between a flange 36 of the distal end and an internal flange of the bolt block 46. The cylinder rod 40 may push the tool mount block 16 along the horizontal portion of the channel 12. When the tool mount block 16 reaches the vertical portion, the tool mount block 16 is pulled along the vertical portion at a slight angle away from the pneumatic cylinder 32. At this point, the bolt block 46 slides towards the distal end of the cylinder bolt 34 against the bias of the spring 38. This provides for a controlled smooth transition from the horiztonal portion of the channel 12 to the vertical portion of the channel 12.

The second linear actuator 47 may also be a pneumatic actuator and/or a servo actuator. In certain embodiments, a second pneumatic cylinder 48 is coupled to the sliding base 20. A second cylinder rod 56 is operable to slide within the second pneumatic cylinder 48. A pressure is applied within the second pneumatic cylinder 48 via a first cylinder port 58 and a second cylinder port 60. When the pressure is applied to the first cylinder port 58, the second cylinder rod 56 pulles the tool mount block 16 towards the second pnymatic cylinder 48 along the vertical track 28. When the pressure is applied to the second cylinder port 60, the second cylinder rod 56 drives the tool mount block 16 away from the second pneumatic cylinder 48 along the vertical track 28.

In certain embodiments, the tool mount block 16 may continue to slide away from the second pneumatic cylinder 48 even when the second cylinder rod 56 is no longer pushing the tool mount block 16. A second cylinder bolt 50 includes a proximal end mechanically fastened to the second cylinder rod 56 and a distal end within an internal channel of the tool mount block 16. A second spring 54 is disposed around the second cylinder bolt 50 in between a flange 52 of the distal end and an internal flange of the tool mount block 16. The second cylinder rod 56 may push the tool mount block 16 back up the vertical portion of the channel 12. When the tool mount block 16 reaches the horizontal portion, the first linear actuator 41 may pull the tool mount block 16 back along the horizontal portion. At this point, the tool mount block 16 slides upwards along the second cylinder bolt 50 against the bias of the second spring 54. This provides for a controlled smooth transition from the vertical portion of the channel 12 to the horizontal portion of the channel 12.

The sliding base 20 may include an adjustable starting and ending point to adjust to different sized substrates 78. In such embodiments, the present invention includes a stop bolt block 66 coupled to the fixed base 14. A bolt runs through the stop bolt block 66. The bolt includes an adjustable stop bolt nut 64 and a fixed stop bolt nut 68. The adjustable stop bolt nut 64 may adjust the bolt along the stop bolt block 66 at different distances to prevent the sliding base 20 from sliding along the horizontal track 24 beyond a designate area.

Figure 8:
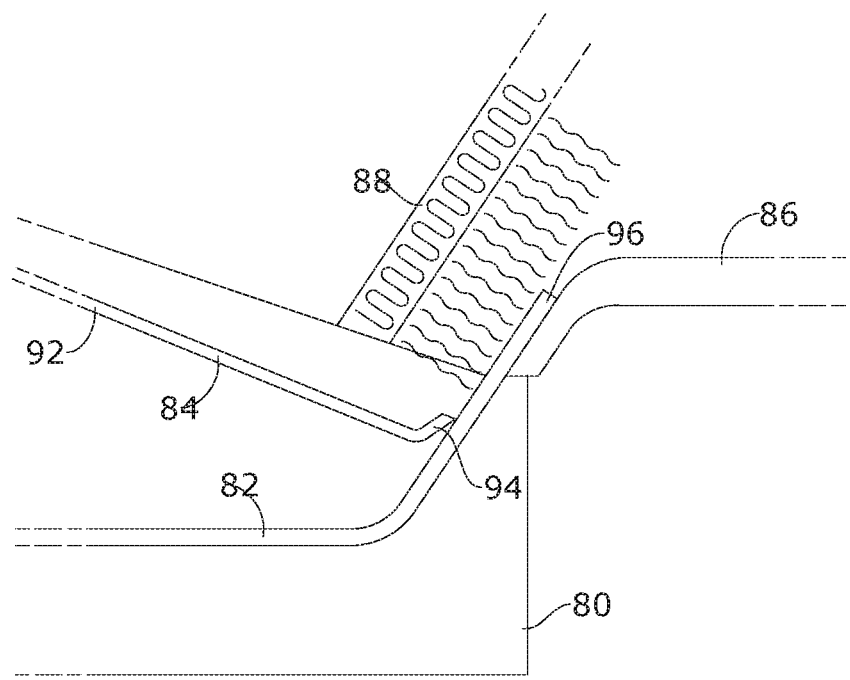
FIG. 8 is a side view illustrating a step of a method of an embodiment of the present invention.
Figure 9:
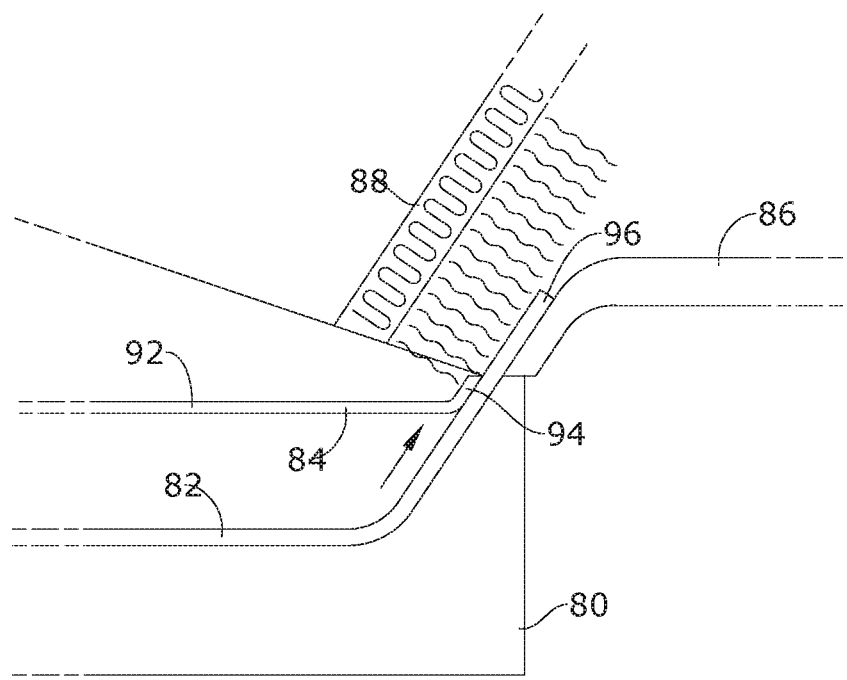
FIG. 9 is a side view illustrating a step of a method of an embodiment of the present invention.
Figure 10:
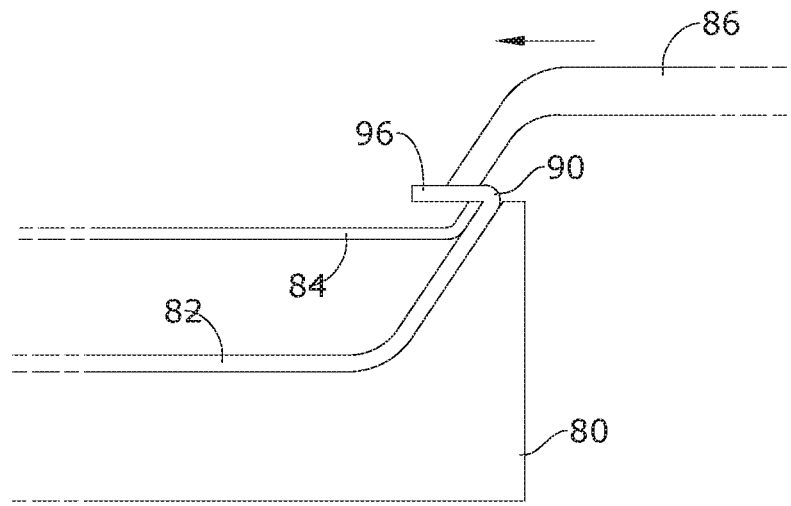
FIG. 10 is a side view illustrating a step of a method of an embodiment of the present invention.
Figure 11:
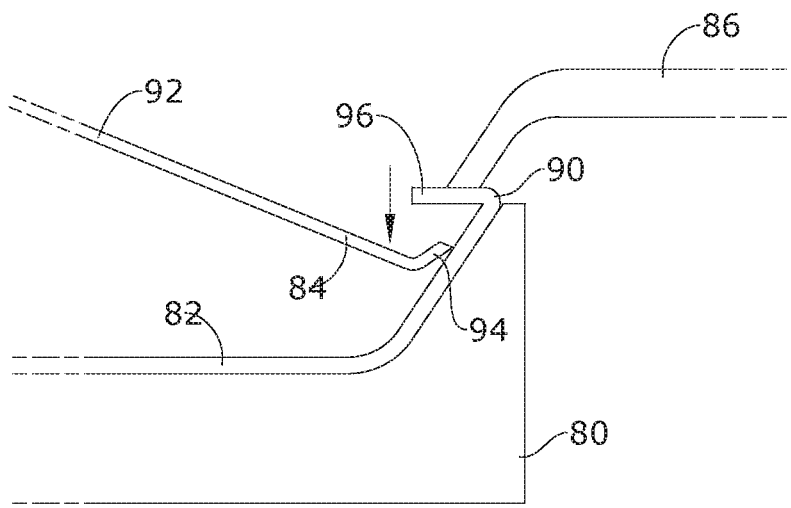
FIG. 11 is a side view illustrating a step of a method of an embodiment of the present invention.
Figure 12:
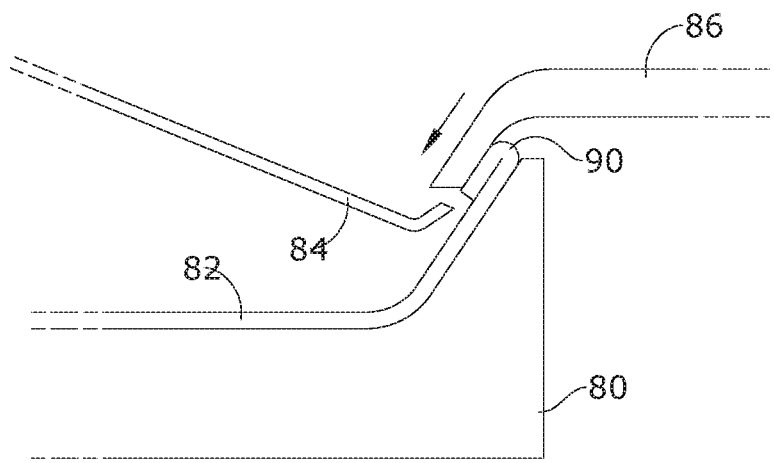
FIG. 12 is a side view illustrating a step of a method of an embodiment of the present invention.

Referring to FIGS. 8 through 12, the present invention further includes a method of folding edges of trim parts. The present invention may be used to finish edges and/or apply fabric, carpet, or vinyl, to headlines, door panels, and numerous other trim parts. The method of the present invention controls the heating and improves how the trim parts are folded. The method of the present invention finishes edges and changes part surface for better fits and finishes. The method of the present invention speeds up the manufacturing process and improves quality of the finished product.

The method of folding edges of trim parts may include the following steps. Place an inner surface of a substrate 82 against a panel support 80 so that an upper end 96 of the substrate 82 is disposed above a top end of the panel support 80. Press a backup blade 84 against an outer surface of the substrate 82 beneath the upper end 96 of the substrate 82. The present invention may utilize the edge folding apparatus of FIGS. 1 through 7 or other types of edge folding apparatuses. A folder tool 86 of the edge folding apparatus is urged against the inner surface of the upper end 96 of the substrate 82 in a horizontal direction which laterally folds the upper end 96 of the substrate 82. Remove the backup blade 84 from the outer surface of the substrate 82. Then urge the folder tool 86 of the edge folding apparatus against the inner surface of the substrate 82 in a vertical direction and downwardly folding the upper end 96 of the substrate 82.

The panel support 80 of the present invention may include a part nest that supports the substrate 82 for folding. The panel support 80 may include a lower portion joined to an upper portion at an angle. The lower portion may be substantially horizontal or at a horizontal angle. The upper portion may extend at a slope relative to the lower portion. A curved bend may join the lower portion and the upper portion. The lower portion and the upper portion may be at an angle relative to one another. The angle may range from 90 degrees to 160 degrees, such as about 135 degrees.

The backup blade 84 may include an elongated body 92 and an engagement end 94. The engagement end 94 is pressed against the outer surface of the substrate 82. In certain embodiments, the engagement end 94 and the elongated body are disposed at the same angle relative to one another as the lower portion and the upper portion. In certain embodiments, the engagement end 94 is pressed against the substrate 82 so that a tip of the engagement end 94 is planar with the top end of the panel support 80. The folder tool 86 is urged against the substrate to fold 90 the upper end 96 of the substrate 82 over the tip of the engagement end 94.

The backup blade 84 is then removed to provide clearance for the additional fold 90 of the substrate 82 downwards. The step of removing the backup blade 84 includes pivoting or lowering the engagement end 94 downward and away from the upper end 96 of the substrate 82 and pulling the backup blade 84 away from the substrate 82. The backup blade 84 may be a motion-controlled device to engage the substrate 82 and then move the backup blade 84 away from the substrate 82. The motion control may be accomplishes using air cylinders, servo controllers, a cam, or the like.

The folder tool 86 may also include an elongated arm and an angled end forming an L-shape. The L-shape allows the folder tool 86 to urge the upper end 96 of the substrate 82 in a horizontal direction laterally, and the folder tool 86 may lower relative to the panel support 80. The lowering of the folder tool 86 pushes the upper end 96 of the substrate 86 downward and onto itself.

Applying heat to the substrate 86 may also enhance the machines performance. The present invention further includes the step of emitting heat to the upper end 96 of the substrate 82 by a heat emitter 88 prior to the step of pressing the backup blade 84 against the outer surface. The heat emitter 88 is spaced away from the upper end 96 of the substrate 82 while emitting heat to allow the process steps to take place while simultaneously applying the heat. The backup blade 14 blocks a portion of the upper end 96 of the substrate 82 from heat emitted from the heat emitter 88 once the backup blade is pressed against the outer surface, which allows for a more precise fold 90. The heat emitter 88 may be an infra-red heater, a hot air emitter, or the like. The heat emitter 88 further allows easy height adjustments. The heat produced by the heat emitter 88 may also be adjusted for different types of materials.

It should be understood, of course, that the foregoing relates to exemplary embodiments of the invention and that modifications may be made without departing from the spirit and scope of the invention as set forth in the following claims.

What is claimed is:

1. A method of folding edges of trim parts comprising steps of:
   placing an inner surface of a substrate against a panel support so that an upper end of the substrate is disposed above a top end of the panel support, the panel support comprises a lower portion joined to an upper portion at an angle;
   pressing a backup blade against an outer surface of the substrate beneath the upper end of the substrate, the backup blade comprising an elongated body and an engagement end, wherein the engagement end and the elongated body are disposed at the angle relative to one another;
   urging a folder tool against the inner surface of the substrate in a horizontal direction and laterally folding the upper end of the substrate;
   removing the backup blade from the outer surface of the substrate, the step of removing the backup blade comprises pivoting the engagement end downward and away from the upper end of the substrate and pulling the backup blade away from the substrate; and
   urging the folder tool against the inner surface of the substrate in a vertical direction and downwardly folding the upper end of the substrate.

2. The method of claim 1, further comprising emitting heat to the upper end of the substrate by a heat emitter prior to the step of pressing the backup blade against the outer surface.

3. The method of claim 2, wherein positioning the heat emitter in spaced away relationship from the upper end of the substrate while the heat emitter is emitting heat.

4. The method of claim 2, wherein blocking a portion of the upper end of the substrate from heat emitted from the heat emitter with the backup blade.

5. The method of claim 2, wherein the heat emitter is at least one of the infrared heater or a hot air emitter.

6. The method of claim 1 in which creating a fold line in the substrate by positioning an end of the engagement end that is spaced apart from the elongated body adjacent the substrate.

* * * * *